(12) United States Patent
Hung et al.

(10) Patent No.: US 7,702,169 B2
(45) Date of Patent: Apr. 20, 2010

(54) SYSTEMS, METHODS, AND APPARATUS FOR TABLE CONSTRUCTION AND USE IN IMAGE PROCESSING

(75) Inventors: Szepo Bob Hung, Carlsbad, CA (US); Ananthapadmanabhan A. Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1280 days.

(21) Appl. No.: 11/208,270

(22) Filed: Aug. 18, 2005

(65) Prior Publication Data
US 2007/0041661 A1 Feb. 22, 2007

(51) Int. Cl.
G06K 9/36 (2006.01)
G06K 9/32 (2006.01)
H04N 7/12 (2006.01)
(52) U.S. Cl. .......... 382/236; 382/295; 348/400.1
(58) Field of Classification Search .......... 382/236, 382/295, 100; 345/37–111; 356/339; 348/34–47, 348/61–80, 254–255, 571, 659.619, 674–677, 348/712, 400.1; 358/519–540
See application file for complete search history.

(56) References Cited

U.S. PATENT DOCUMENTS

| 5,282,036 | A  | * | 1/1994 | Worley et al. ............... 348/674 |
| 5,408,267 | A  | * | 4/1995 | Main .......................... 348/254 |
| 6,160,532 | A  |   | 12/2000 | Kaburagi et al. |
| 6,166,781 | A  |   | 12/2000 | Kwak et al. |
| 6,304,300 | B1 |   | 10/2001 | Warren et al. |
| 6,774,839 | B2 | * | 8/2004 | Talbot et al. ............. 342/357.06 |
| 6,791,576 | B1 | * | 9/2004 | Lin ............................ 345/690 |
| 6,833,876 | B1 | * | 12/2004 | Pirjaberi ..................... 348/674 |
| 7,386,049 | B2 | * | 6/2008 | Garrido et al. ......... 375/240.15 |
| 2003/0128299 | A1 |   | 7/2003 | Coleman et al. |

* cited by examiner

*Primary Examiner*—Samir A. Ahmed
*Assistant Examiner*—Mehdi Rashidian
(74) *Attorney, Agent, or Firm*—Kyong Macek; Espartaco Diaz Hidalgo

(57) ABSTRACT

A method of processing an image includes selecting, for each of a plurality of picture element values in at least a portion of the image, one among a plurality of offset values. For each of the plurality of picture element values, an index value is obtained based on (A) the selected offset value and (B) a portion of the picture element value. For each of the plurality of picture element values, an entry is retrieved from a lookup table according to the corresponding index value.

22 Claims, 14 Drawing Sheets

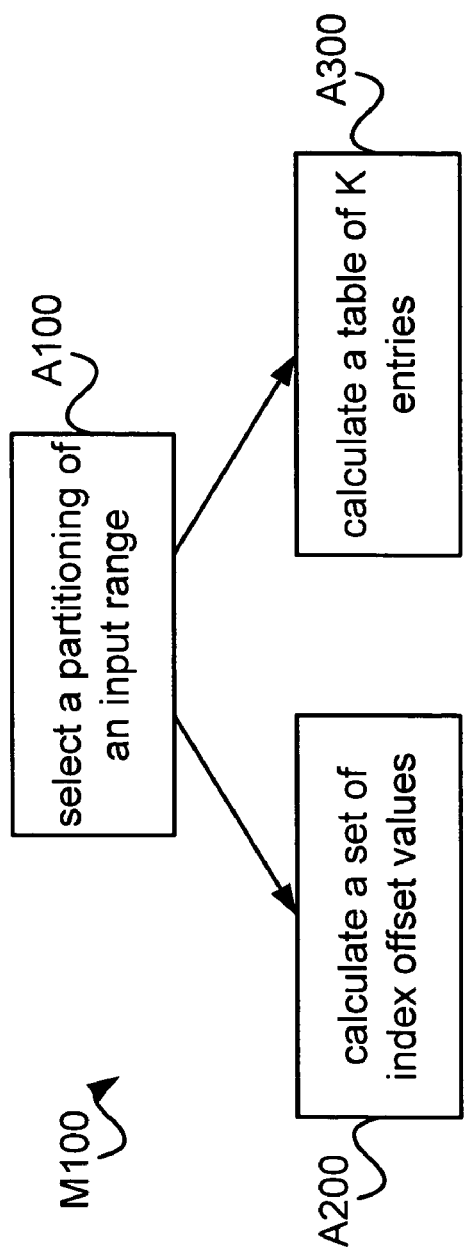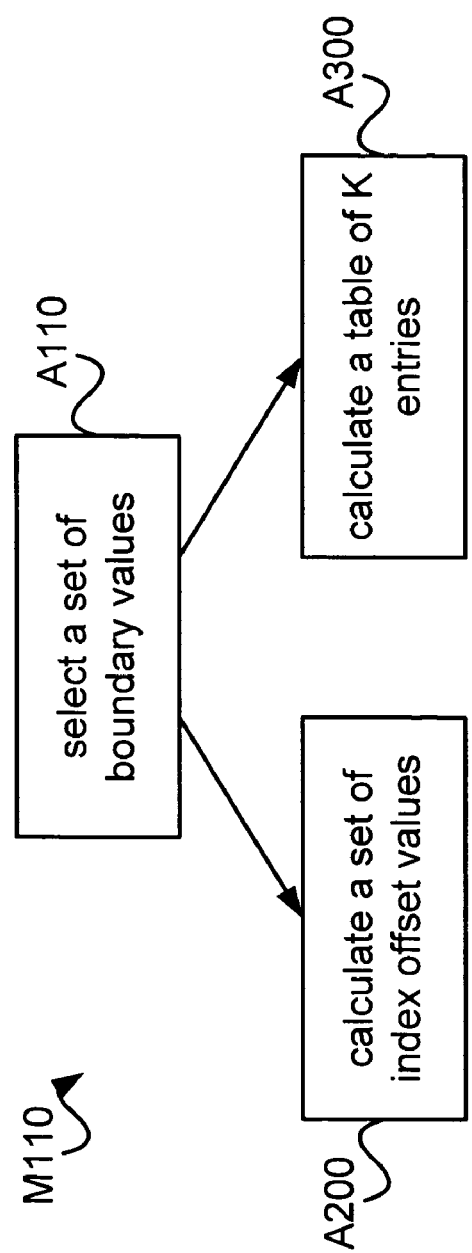

```
function traverse_tree(int index, int max_val) {
local int i, j, k, sum;
global int L, N, no_of_candidates, b(N), b_record(MAX_CANDIDATES);

/* base case: for all leaves, calculate sum of */
    /* entries and compare to L */
    if (index == 1)
        for (j = 2; j <= j + 2; j < max_val) {
            b(index) = j;
            sum = 0;
            for (k=0; k++; k<N)
                sum = sum + ( (b(k+1)-b(k)) >> k);
            if (sum <= L)
                b_record(no_of_candidates++) = b;
        }

/* recursive case: visit all child nodes until */
    /* leaves are reached */
    else
        for (i = 2^index; i <= i + 2^index; i < max_val) {
            b(index) = i;
            call traverse_tree(index - 1, i)
        }
    endif
return
}
```

FIG. 5

SYSTEMS, METHODS, AND APPARATUS FOR TABLE CONSTRUCTION AND USE IN IMAGE PROCESSING

FIELD OF THE INVENTION

This invention relates to image processing.

BACKGROUND

Many image display systems have nonlinear responses. A cathode-ray tube (CRT), for example, will generally produce an image in which the relationship between input signal level and output picture element (pixel) luminance is nonlinear. Similarly, a printer will generally produce an image in which the relationship between input signal level and output pixel tone density is nonlinear. Effects of display nonlinearity may include such artifacts as loss of definition in low-light or shadow areas.

In order to achieve a perceptually appropriate reproduction of image tone scale, it is desirable to compensate such nonlinearity. It may be desired to enhance detail in the shadow regions of an image, for example, without causing undue loss of definition in the highlights.

An image acquisition system may include a sensor such as a charge-coupled device (CCD) or a complementary metal-oxide-semiconductor (CMOS) sensor. It may be desired to apply a nonlinear mapping to the output signal of such a sensor. For example, it may be desired to precompensate for display nonlinearity; to compensate for nonlinearity in the sensor response (such as a logarithmic response); and/or to code the signal into a standard, perceptually uniform, and/or device-independent space (such as sRGB, YCrCb, CIE Lab or Luv or XYZ, etc.).

The parameter gamma ($\gamma$) is commonly used to characterize a nonlinear reproduction of tone scale. FIG. 1 shows an example in which a nonlinear mapping from normalized input value to normalized output value is modeled by the power function $\gamma=1/(2.2)$. The operation of applying such a mapping to an image signal is called gamma correction.

The shape of the gamma curve may affect not only the overall color appearance of an image, but also the image brightness and contrast. A gamma correction operation is typically performed on the luminance component of a luminance-chrominance signal, such as the Y component of a YCbCr signal. Alternatively, a gamma correction operation may apply the same mapping to each of the components of a multispectral signal (for example, the R, G, and B components of an RGB signal).

Although computing a nonlinear function such as a power function may be computationally expensive, gamma correction is typically implemented rather efficiently by using a look-up table (LUT) that maps input values to precomputed output values. A pixel value is applied as an index to the table, and the mapped output value is retrieved from the indexed location. In this manner, mapped values may be obtained at run-time with greatly reduced complexity.

One problem with LUT implementation of gamma correction is that the table size grows exponentially with the width of the input values in bits. Image sensors may output pixel values that are 8, 10, 12, or even 14 bits wide. While an LUT for mapping an 8-bit input pixel has only 256 ($2^8$) entries, an LUT for mapping 14-bit pixels has 16,384 ($2^{14}$) entries. For many hardware implementations, such a table would take up a prohibitively large area of silicon. Furthermore, for applications that include loading of a gamma curve table at run-time, the operation of loading such a large table may be too time-consuming.

SUMMARY

A method of processing an image according to an embodiment includes selecting one among a plurality of offset values for each of a plurality of picture element values in at least a portion of the image. For each of the plurality of picture element values, the method includes obtaining an index value based on (A) the selected offset value and (B) a portion of the picture element value, and retrieving an entry from a lookup table according to the corresponding index value.

An apparatus configured to process an image according to an embodiment includes an array of logic elements configured to (A) identify, for each of a plurality of picture element values in at least a portion of the image, and from among a plurality of sections of a range of values, the section that includes the picture element value and (B) retrieve an offset value associated with the section. The apparatus includes a shifter configured to shift each of the plurality of picture element values according to a position of the corresponding section within the plurality of sections, and an adder configured to obtain, for each of the plurality of picture element values, an index value based on the offset value and the shifted picture element value. The array of logic elements is configured to retrieve, for each of the plurality of picture element values, an entry from a lookup table according to the corresponding index value.

A method of image processing according to a further embodiment includes selecting a set of boundary values indicating a partitioning of a range of P values into N sections. The method includes constructing, based on the selected set of boundary values and a nonlinear mapping function, a lookup table having N sections, wherein each entry of the lookup table corresponds to at least one of the P values. The method also includes calculating, for each of at least (N−1) of the sections, a corresponding index offset value based on the selected set of boundary values.

BRIEF DESCRIPTION OF THE DRAWINGS

FIG. 2A is a flowchart of a method M100 according to an embodiment.

FIG. 2B is a flowchart of an implementation M110 of method M100.

FIG. 5 is an example of pseudocode for a recursive function configured to traverse a tree as in FIG. 4.

DETAILED DESCRIPTION

Embodiments include methods of applying nonlinear functions, including methods of gamma correction and/or alteration, and methods of constructing lookup tables. Embodiments also include systems, methods, and apparatus that may be used in processing signals from sensors such as CCDs and CMOS sensors. Further embodiments include systems, methods, and apparatus that may be used in processing signals for display via a device such as a printer, CRT, liquid crystal display (LCD), organic light-emitting diode (OLED) display, plasma display panel (PDP), and/or micro-electromechanical system (MEMS) display device (e.g. a spatial light modulator) such as a digital mirror device (DMD) or interferometric modulator. In some applications, a display device may be implemented as a display of a cellular telephone, portable digital assistant (PDA), camcorder, or other portable or handheld unit.

The mapping function of a lookup table may be tailored to a particular sensor and/or application. It may be desirable in some cases to change the mapping function to one that is appropriate for a different sensor or application. For example, it may be desirable to configure an apparatus, such as a signal processing unit, to apply a mapping according to a different gamma curve. One way to implement special effects, such as changing the contrast and/or dynamic range of an image, is to use a different gamma curve. Thus it may be desirable to configure a device performing an operation that includes use of a lookup table, such as a gamma correction or alteration operation, to apply a different mapping function.

Configuration of a device to apply a different mapping function may include causing the device to reference a different lookup table. Such configuration may include generating a lookup table according to the different mapping function and/or loading another lookup table from a lower level of the memory hierarchy. In one example, the lookup table is loaded from read-only memory (ROM) into random-access memory (RAM). A lower level of the memory hierarchy may have a denser storage characteristic, while a higher level of the memory hierarchy may have a more rapid access characteristic. As noted above, however, the size of a lookup table grows exponentially with the width of the index values. Therefore, loading a new table may present a problem when the width of the pixel values is larger than eight bits. For example, the time required to load a new table may exceed an acceptable delay for a consumer application.

Figure 1:
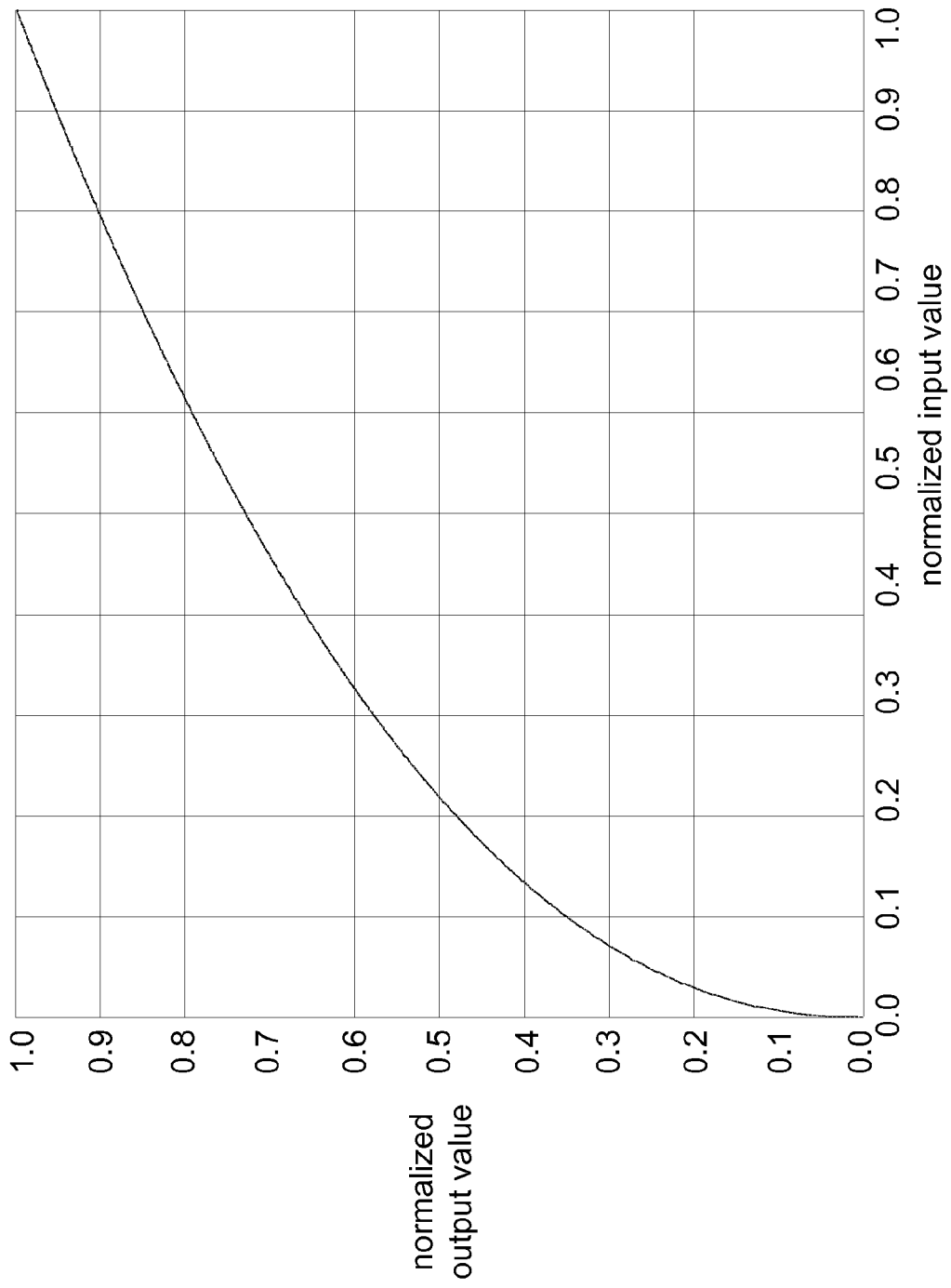
FIG. 1 is a diagram of a gamma curve.

In practice, a typical gamma curve as may be used in an image acquisition application has a steep slope at the low end of the input range and a shallow slope at the high end of the input range. FIG. 1 shows one example of such a curve. At the high end of the input range, the slope of the curve is less than one. In this region, the differences between output values that correspond to adjacent index values may be relatively small. Therefore, it may be acceptable to reduce the mapping resolution, and thus to reduce the size of the table, by mapping more than one input value in this region to the same output value. Because the slope of the curve is much greater than one at the low end of the input range, however, it may be advantageous to map at a high resolution in this region. For example, it may be desirable to map each index value in this region to a unique output value.

A lookup table is typically addressed using an index that has a given maximum width of s bits and may have any of $P \leq 2^s$ different values. The domain or input range of the lookup table may include all $2^s$ possible values of the index, or may include only some portion of that range. In the description below, it is assumed that the domain of the table includes the entire range of values from 0 to $M=2^s-1$, such that $P=2^s$, although embodiments are specifically contemplated in which the domain of the lookup table includes only a portion less than all of that range.

It is desirable to obtain a lookup table of reduced size. For example, it is desirable to apply the mapping function using a lookup table that has L entries, where L<P. The parameter L may be determined according to system constraints such as available transfer time and/or chip area. Embodiments include systems, methods, and apparatus that construct and/or apply a lookup table that maps P input values to L or fewer output values.

FIG. 2A shows a flowchart of a method M100 according to an embodiment. Task A100 selects a partitioning of an input range that satisfies one or more criteria. Based on the selected partitioning, task A200 calculates a set of index offset values v. Based on the selected partitioning and a mapping function, task A300 calculates a table of $K \leq L$ entries. Such a method may be performed offline to obtain a table for a desired mapping function such as a gamma curve.

FIG. 2B shows a flowchart of an implementation M110 of method M100, which includes an implementation A110 of task A100. Task A110 selects a set of boundary values b according to a desired maximum number of table entries L. The set of boundary values indicates a partitioning of the range of index values into N sections, where the value of N may be specified or may be selected by task A110.

A set of boundary values includes an initial value $b_0$, a terminal value $b_N$, and (N-1) intermediate values $\{b_1, b_2, \ldots, b_{N-1}\}$. The boundary values $b_0$ and $b_N$ are given the lowest and highest values, respectively, of the range of index values. In one example, the range of index values is the interval [0, M], such that $b_0=0$ and $b_N=M$, although embodiments are specifically contemplated in which the input range includes only a portion less than all of that interval.

In an example as described herein, a set of boundary values defines a partitioning of the input range such that section i is the interval $[b_i, b_{i+1})$ for $0 \leq i \leq N-2$, and section (N-1) is the interval $[b_{N-1}, b_N]$. It will be understood that with appropriate changes to the component tasks, method M100 may also be implemented such that section 0 is the interval $[b_0, b_1]$ and section i is the interval $(b_i, b_{i+1}]$ for $1 \leq i \leq N-1$.

In one example, task A110 is configured to select a set of boundary values that satisfies the following three conditions:

a) The set of boundary values b is an ordered set defining nonempty sections. This condition may be expressed as $b_i < b_{i+1} \forall i, 0 \leq i < N$.

b) For $0 < i < N$, $b_i$ is an integer multiple of $2^i$.

c) The size of a reduced LUT constructed according to the set b will not exceed the desired maximum number of table entries L. This condition may be expressed as $$\sum_{i=0}^{N-1} [(b_{i+1} - b_i) >> i] \leq L.$$

Figure 3:
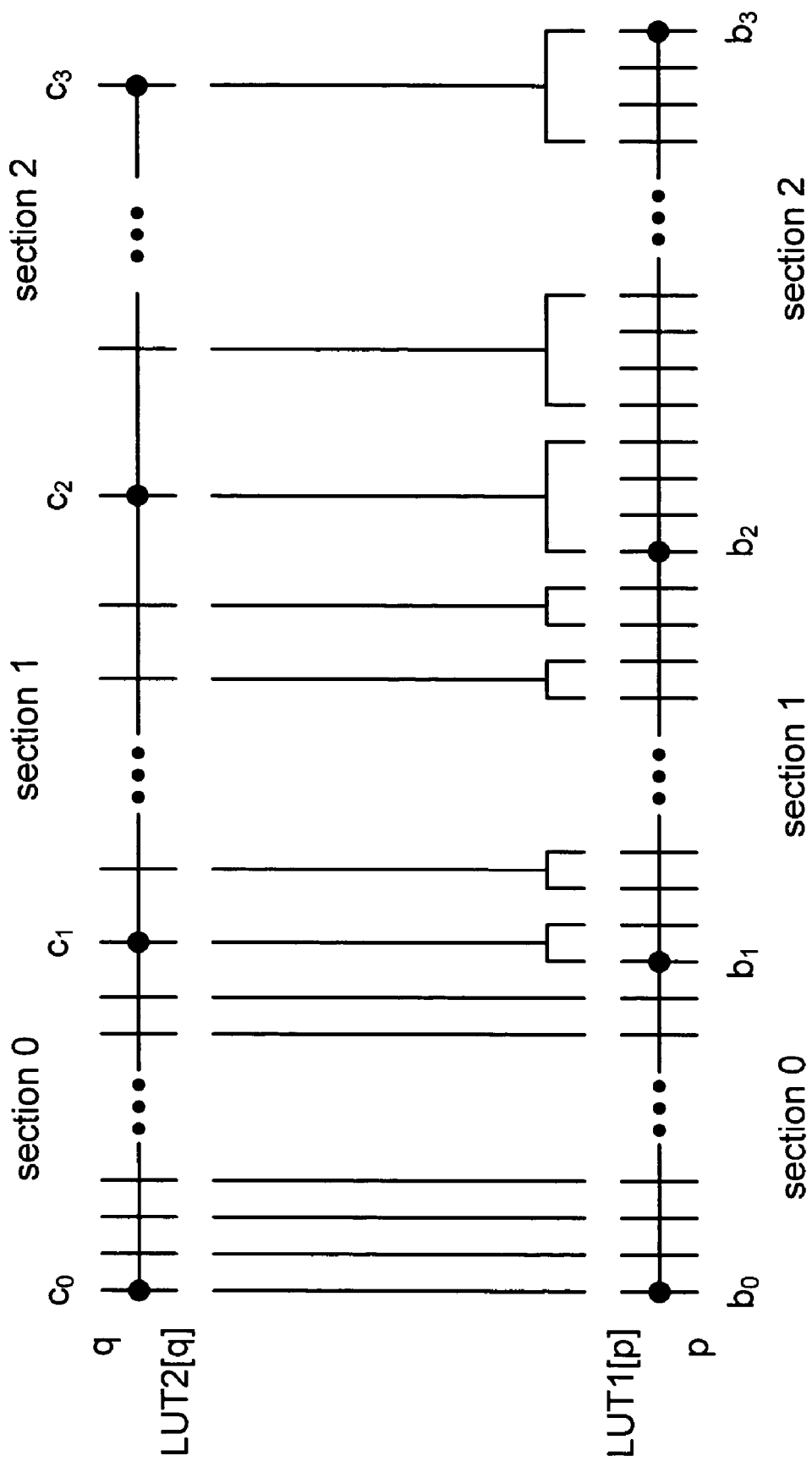
FIG. 3 is a diagram of a derivation of a lookup table LUT2 from a lookup table LUT1.

FIG. 3 illustrates a derivation, according to such a partitioning, of a reduced table LUT2 having K entries from an original table LUT1 having P entries. In this example, N=3. In the first section (section 0), full resolution is applied to generate the entries of table LUT2 from the corresponding entries of table LUT1. Typically, entries in section 0 of table LUT2 are obtained according to LUT2[q]=LUT1[p] for p=q. In the second section (section 1), a pair of values from table LUT1 are combined to generate each value of table LUT2. In the third section (section 2), four values from table LUT1 are combined to generate each value of table LUT2. In general, in the i-th section, $2^i$ output values from table LUT1 are combined to be represented with a single output value in table LUT2.

Figure 4:
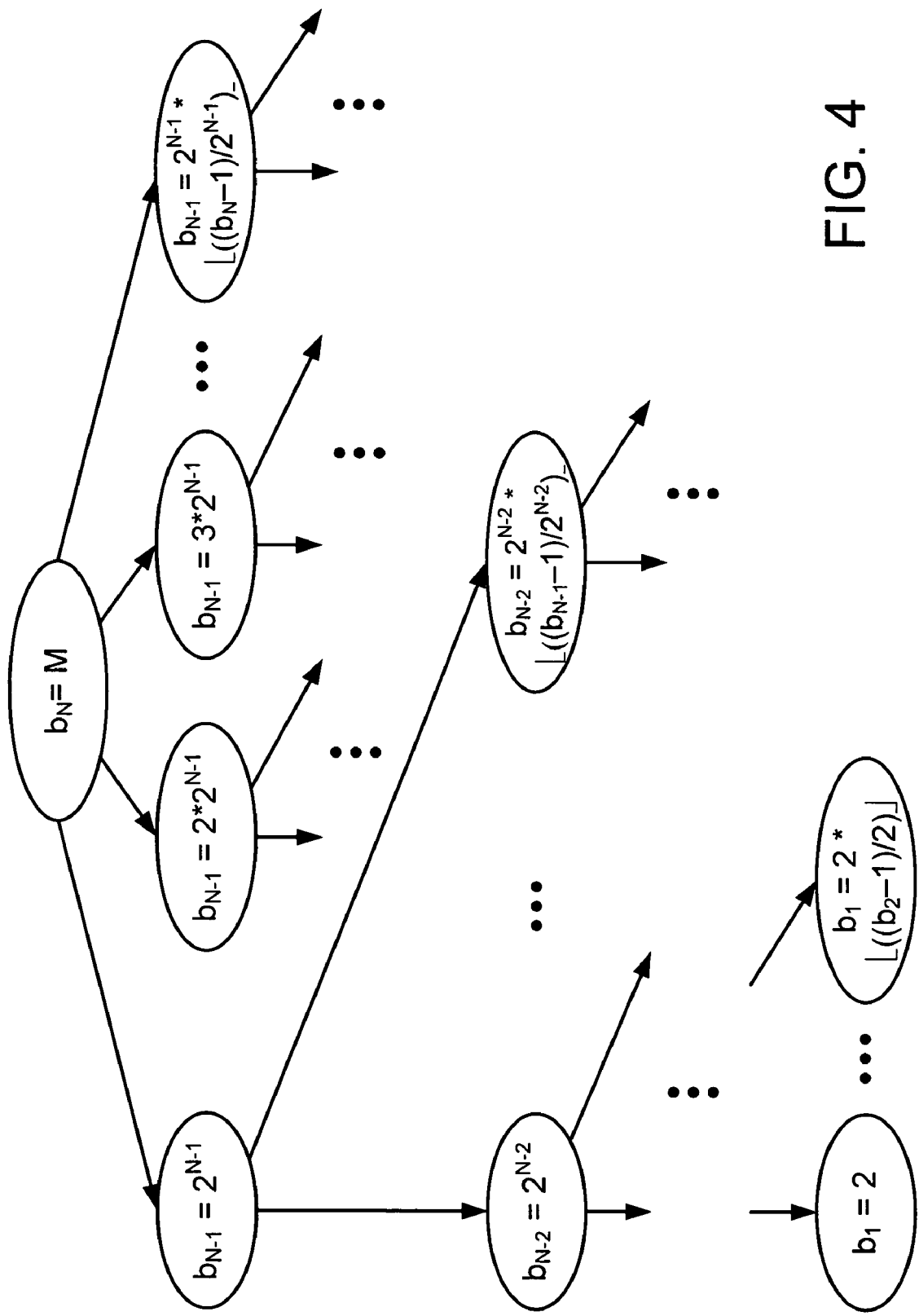
FIG. 4 shows an example of sets of boundary points organized as paths of a tree.

Many different sets of boundary values may satisfy the conditions according to which task T110 makes its selection. A universe of possible candidate sets b may be represented as paths through a tree with (N−1) levels below the root, the values of $b_0$ and $b_N$ being the same for each of the candidate sets. FIG. 4 shows one example of such a tree for $(b_0, b_N)=(0, M)$, wherein the nodes at each level below the root may be enumerated according to the following expression:

$$b_i = 2^i \times h_i,$$

where $$h_i = \left\{1, 2, \ldots, \left\lfloor \frac{b_{i+1}-1}{2^i} \right\rfloor\right\}.$$

As in the example of FIG. 4, a tree or other data structure may be configured such that it indicates sets $b_i$ which satisfy the conditions a) and b). It may be desirable to consider whether each of some or all of those sets also satisfies condition c). Task A110 may be configured to determine whether a corresponding set satisfies condition c), and method M110 may be implemented to traverse the data structure, executing such an instance of task A110 for each set.

One way to traverse a data structure such as the tree shown in FIG. 4 is with an (N−1)-nested loop structure. Processing of the various sets may be performed in serial and/or in parallel. A recursive technique may also be used to traverse the paths in the tree to determine whether the set corresponding to each path meets condition c).

FIG. 5 shows a pseudocode listing for one example of such a recursive function. In the recursive case, the function calls itself to process the next lower level of the tree until the bottom level is reached. In the base case, the leaves that depend directly from a common node are visited, and the function determines whether the set represented by the path ending at each leaf satisfies condition c).

One of skill in the art will recognize that such embodiments may be implemented via many other procedural and/or functional expressions. A potential advantage of a recursive function is that the same function may be used for different values of N. In many practical cases, however, it may be sufficient to consider only a limited number of values of N. Typically, the use of one or two partitions is not enough to achieve an acceptable error, while use of more than five partitions is rarely needed. Therefore it is usually enough to consider the cases N={3, 4, 5}, such that method M110 may be adequately implemented using a nested-loop routine or similar procedure or function.

Because the table LUT2 has fewer than P entries, table LUT2 is indexed differently than table LUT1, with the indexing scheme being dependent on the partitioning. For the set $b_i$ selected by task A110, task A200 computes a corresponding set of N index offset values $\{v_0, \ldots, v_{N-1}\}$. In one example, task A200 calculates the index offset values according to the expression $v_i=c_i-(b_i>>i)$, where $c$, $$c_0 = b_0, \; c_i = b_0 + \sum_{j=0}^{i-1}[(b_{j+1}-b_j)>>j]$$

for $$0 < i < N,$$

is the index value of table LUT2 to which $b_i$ is mapped. Use of the index offset values is described in greater detail below.

Based on a mapping function $f$ and the set of boundary points b selected by task A110, task A300 constructs a lookup table LUT2 having N sections and K≦L entries. Each entry in section i of table LUT2 is based on $2^i$ values of function $f$, which describes a nonlinear relation between input values and output values such as a gamma curve. The mapping function $f$ may be specific to a sensor or display device, or a combination of the two, or may be generic to a class of such sensors, devices, or combinations. Function $f$ may be supplied by a vendor, derived from measurement of a sensor and/or display device, and/or selected according to a desired relation or effect.

An implementation A310 of task A300 obtains the entries of LUT2 according to a procedure that may be expressed as follows:

LUT2[q]=f(q),i=0;

LUT2[q]=g{f(r),f(r+1), . . . , f(r+$2^i$−1)},0<i<N, where 0≦q<K is the index to table LUT2, i is the section index of q, r=(q−$v_i$)<<i=$b_i$+[(q−$c_i$)<<i], and g is an aggregation function. The function g{·} may be an averaging function such as an arithmetic or other mean such as a geometric mean, or a median, mode or other statistical measure of average.

In an implementation A320 of task A300, the mapping function $f$ is represented by a lookup table LUT1 having P entries. Table LUT1 may be retrieved from storage or may be generated according to an expression of the mapping function $f$. The table LUT1 may be supplied by a vendor, derived from measurement of a sensor, and/or selected according to a desired relation or effect. In one example, each entry in section i of table LUT2 is derived from $2^i$ entries of table LUT1:

LUT2[q]=LUT1[q],i=0;

LUT2[q]=g{LUT1[r],LUT1[r+1], . . . , LUT1[r+$2^i$−1]},0<i<N, where 0≦q<K is the index to table LUT2, i is the section index of q, r=(q−$v_i$)<<i=$b_i$+[(q−$c_i$)<<i], and g is an aggregation function as described above.

The entries of table LUT2 need not have the same width as the index values. Many modern CCD and CMOS sensors can generate signals having 8, 10, 12, or even 14 bits per pixel. Other elements in the signal path, however, may be limited in terms of the width of the signals they can pass or process. Compliance with system requirements may therefore require reducing the widths of the pixel values. One industry standard requires each component of a YCrCb signal to be in the format of 8 bits per pixel. Task A300 may be configured to construct a table LUT2 whose entries have fewer bits than the maximum table index value.

Figure 6:
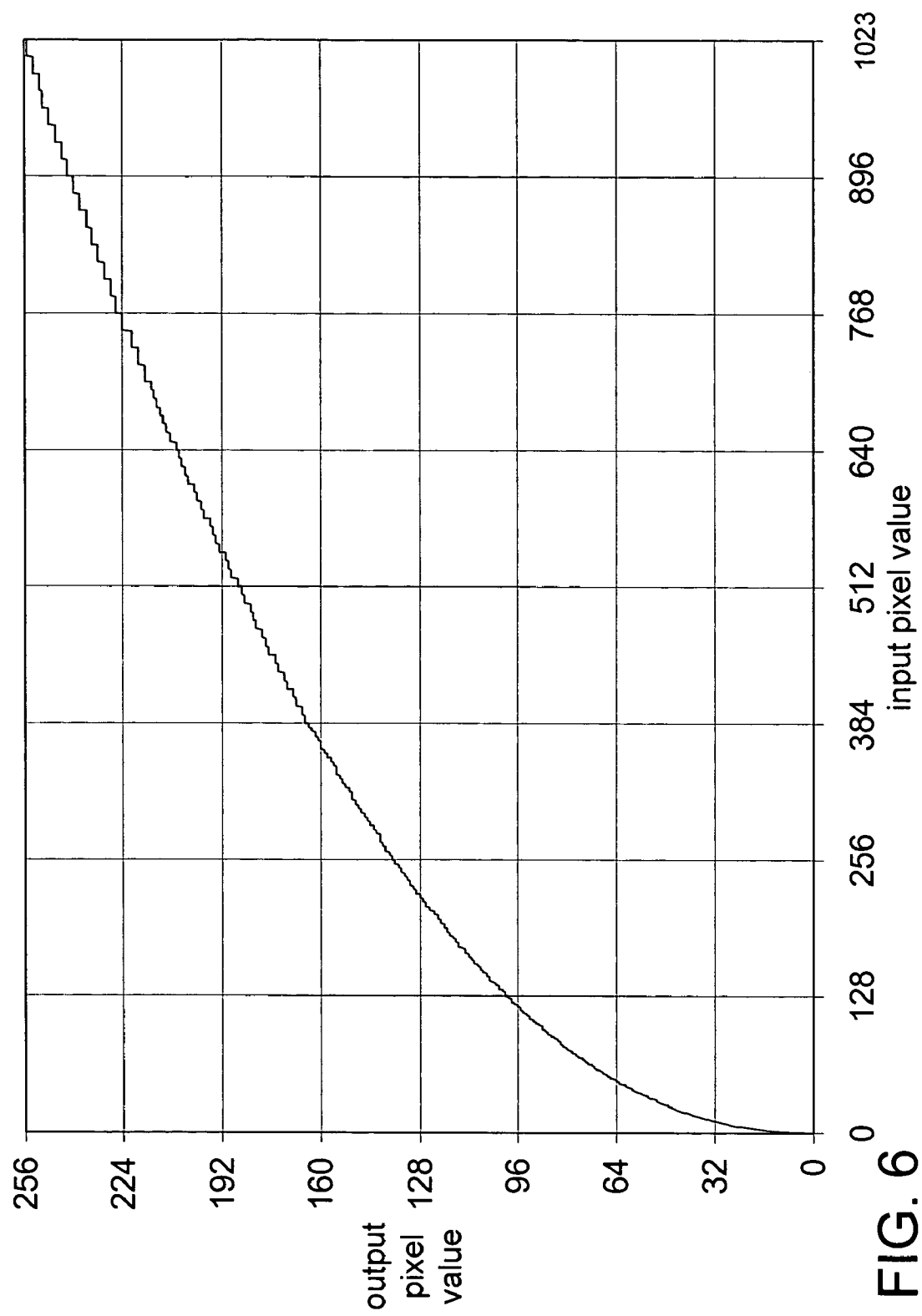
FIG. 6 is an example of a nonlinear mapping as stored in a lookup table according to an embodiment.

FIG. 6 shows an example of a table LUT2 that maps the 10-bit input range (0-1023) to the 8-bit output range (0-255) according to the set of boundary points {0, 64, 192, 384, 704, 1023}, a normalized function $f$ based on the gamma curve $\gamma=1/(2.2)$, and the arithmetic mean function $$g = \frac{1}{2^i} \sum_{j=0}^{2^i-1} f(r+j).$$

In this particular example, $$f(x) = 256\left(\frac{x}{1024}\right)^{\frac{1}{2.2}}$$

and the number of entries K in table LUT2 is 236. Another example of a set of boundary points that may be suitable for such an application is {0, 4, 144, 728, 1008, 1023}.

Figure 7:
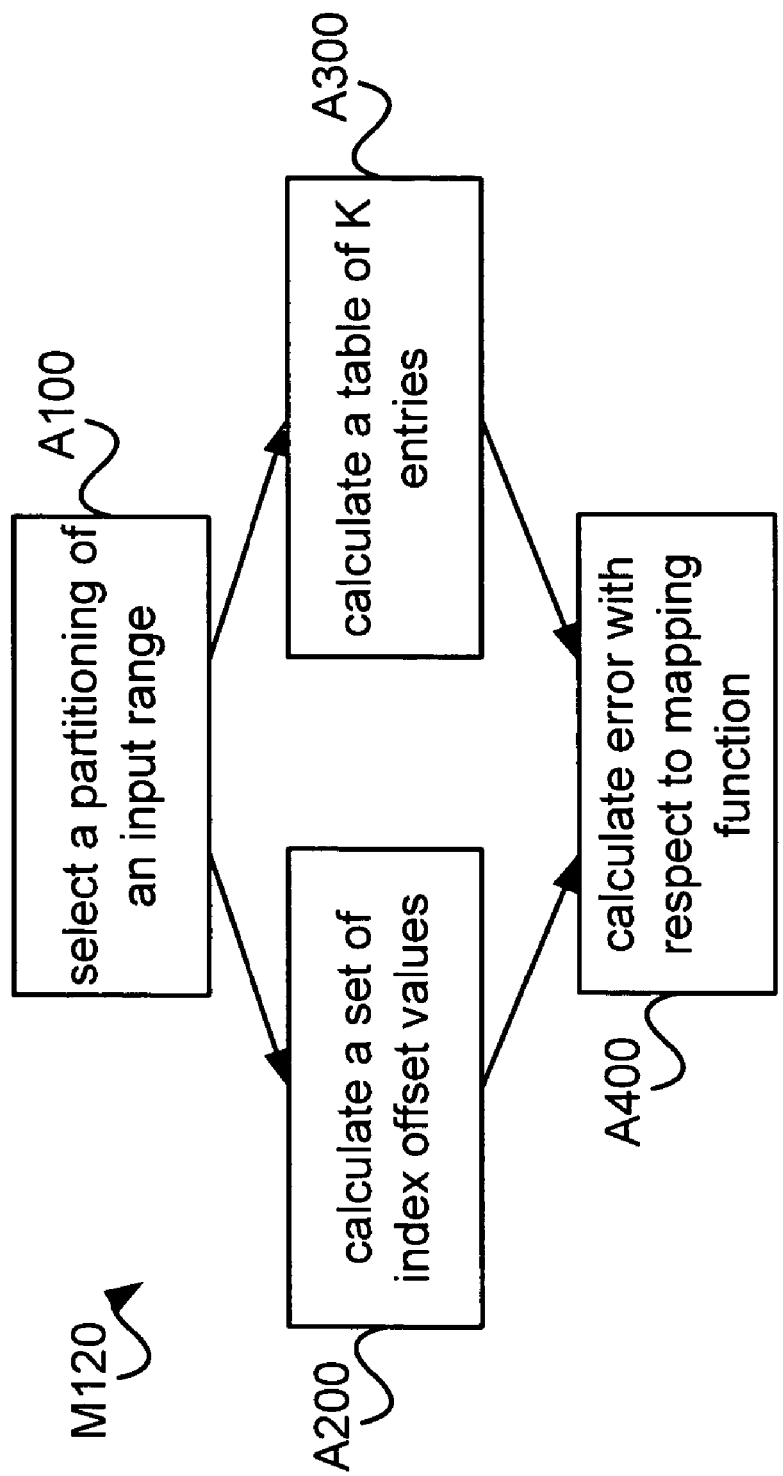
FIG. 7 is a flowchart of an implementation M120 of method M100.

FIG. 7 shows a flowchart of an implementation M120 of method M100 that includes a task A400. Task A400 calculates an error of table LUT2 with respect to the mapping function $f$. In one example, a quantization error E is calculated as a sum of absolute differences corresponding to each index value of the input range, such as:

$$E = \sum_{p=b_0}^{b_N} \text{abs}(f(p) - LUT2[s]),$$

where $$s = v_i + (p >> i)$$

and i denotes the index of the section (as defined by the set of boundary points $b_i$) in which p resides, $0 \leq i \leq N$.

In another example, the error E is calculated as a weighted sum of absolute differences, such as:

$$E = \sum_{p=b_0}^{b_N} [w(p) \times \text{abs}(f(p) - LUT2[s])],$$

where w is a weighting function. The weighting function w may be selected according to a criterion such as visual perceptibility to error. For example, it may be desirable to weight errors corresponding to index values near the center of the input range more heavily than error corresponding to index values at the ends of the input range, as midrange error may be more visually perceptible. In a further example, the value of the weighting function w is indexed by the section index i:

$$E = \sum_{p=b_0}^{b_N} [w[i] \times \text{abs}(f(p) - LUT2[s])].$$

In an implementation A420 of task A400, the mapping function $f$ is represented by a lookup table LUT1 having P entries. Such an implementation may calculate an error E according to one of the following modifications of an expression as discussed above:

$$E = \sum_{p=b_0}^{b_N} \text{abs}(LUT1[p] - LUT2[s]),$$

$$E = \sum_{p=b_0}^{b_N} [w(p) \times \text{abs}(LUT1[p] - LUT2[s])],$$

$$E = \sum_{p=b_0}^{b_N} [w[i] \times \text{abs}(LUT1[p] - LUT2[s])].$$

Figure 8:
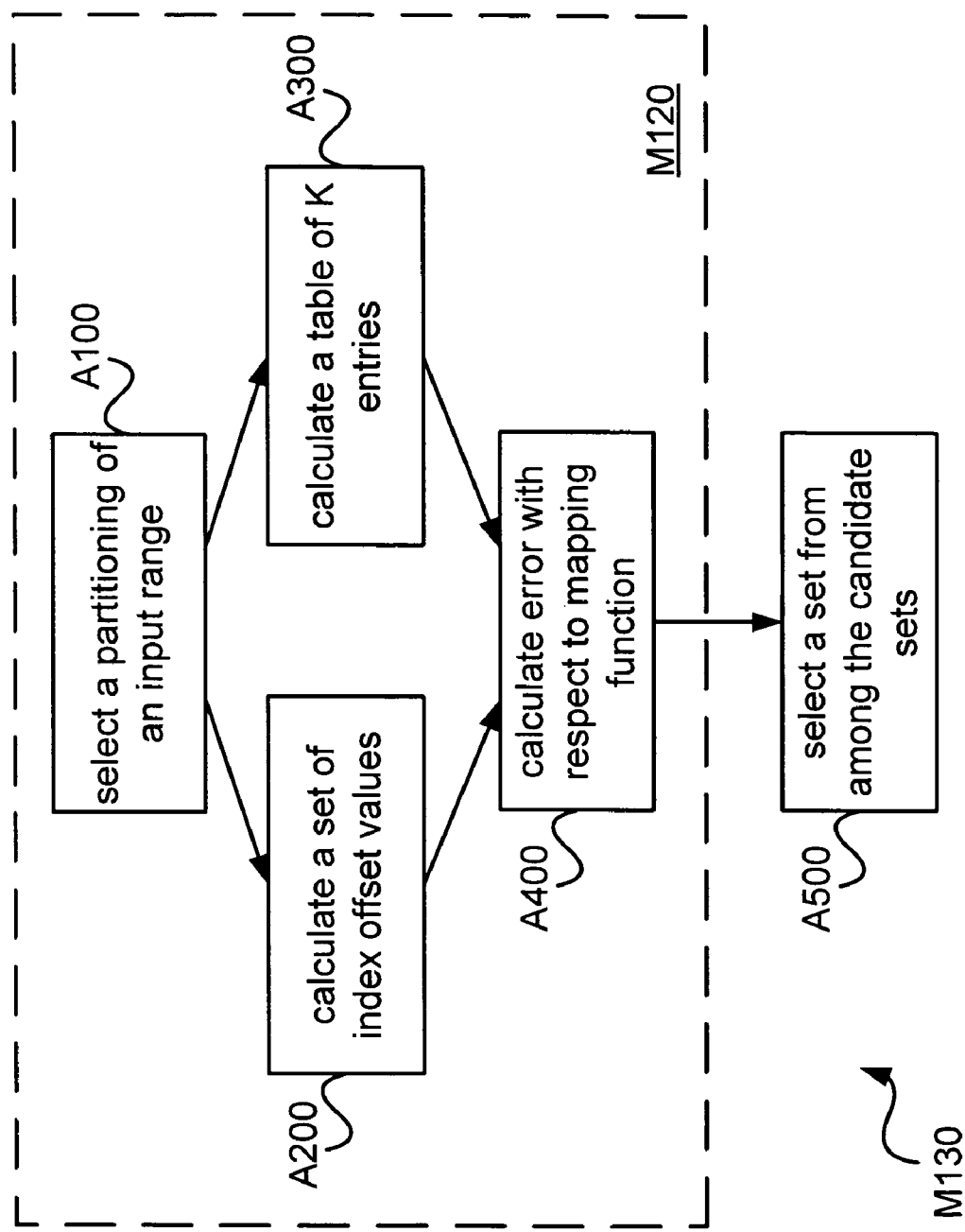
FIG. 8 is a flowchart of an implementation M130 of method M100.

FIG. 8 shows a flowchart of an implementation M130 of method M100. Method M130 includes more than one instance of method M120, each corresponding to a different partitioning of the input range, and a task A500 that selects a set of boundary points from among the candidate sets according to one or more criteria. Within method M130, the various instances of method M120 may be performed in parallel and/or serially in a loop. In one example, task A500 is configured to select the candidate set of boundary points that has the smallest value $E_{min}$ of error E.

Figure 9:
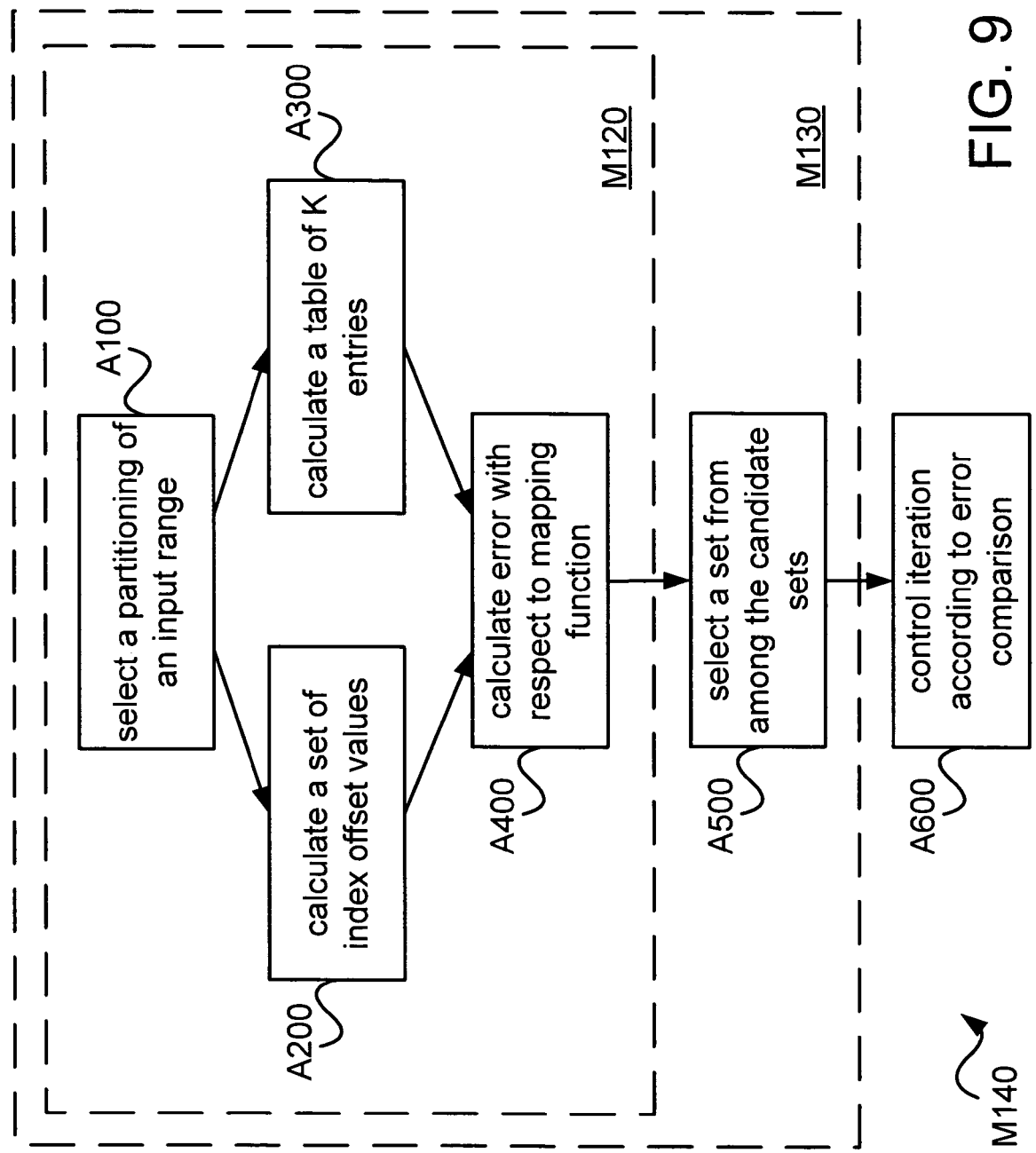
FIG. 9 is a flowchart of an implementation M140 of method M100.

While an implementation of method M130 may be performed for a given value of N, it may also be desired to consider tables for more than one value of N. FIG. 9 shows a flowchart of an implementation M140 of method M100 that includes more than one instance of method M130, each instance corresponding to a different value of N and producing a respective minimum error value $E_{min}$. As mentioned above, values of N={3, 4, 5} are most likely to be practically useful for gamma curve applications, but any value or values may be used.

Within method M140, the various instances of method M130 may be performed in parallel and/or serially in a loop. For serial execution, method M140 may include an iteration control task A600 that determines whether $E_{min}(N) \leq E_{min}(N-1)$ for the current value of N. If the relation is true, task A600 initiates an instance of method M130 for the next value of N. Otherwise, task A600 selects the set of boundary points associated with the error $E_{min}(N-1)$, with the value of N being decremented as needed before use in further tasks. The selected set of boundary points and corresponding set of index offset values and table LUT2 may be stored to a data storage device and/or made available to another application or device.

In some implementations, the reduced table LUT2 corresponding to the selected set of boundary points may be modified to reduce error further. For example, a computationally intensive method of error reduction may be applied which is not suitable, in the particular application, for use on all candidates in task A400. Such a method may be based on a measure of perceptibility of the error with respect to mapping function $f$ for table LUT1.

Method M100 may be configured to output the selected set of boundary points and corresponding set of index offset values and table LUT2. For example, method M100 may output the sets and table for storage to a digital camera or other device including an image sensor, such as a cellular telephone, PDA, or portable multimedia player/recorder. Alternatively, method M100 may be configured to store the sets and table as a candidate to be compared with others according to some criteria, such as suitability for a particular sensor or application.

An implementation of method M100 may be used to obtain a table LUT2 for applying the same nonlinear mapping function $f$ to each of a group of devices or sensors, such as a batch or model of sensor. Alternatively, an implementation of such a method may be configured for use in a production environment for many different forms of function $f$. For example, such a method may be configured to obtain a table LUT2 that is unique for each device or sensor, according to a measured characteristic of the sensor and/or according to a desired effect. Implementations of method M100 may be embodied in hardware, software, and/or firmware.

Embodiments also include systems, methods, and apparatus that perform mapping of an index having one of P values, using a lookup table having fewer than P entries. Advantages of such embodiments may include a reduced storage requirement. Implementations may use operations of shifting and addition to identify a table entry corresponding to the input index value at a relatively low computational cost. In a case where the index is a pixel value, an embodiment may be configured to produce a processed image, such as a gamma-corrected image, via a pixel-by-pixel mapping of an original image.

Figure 10:
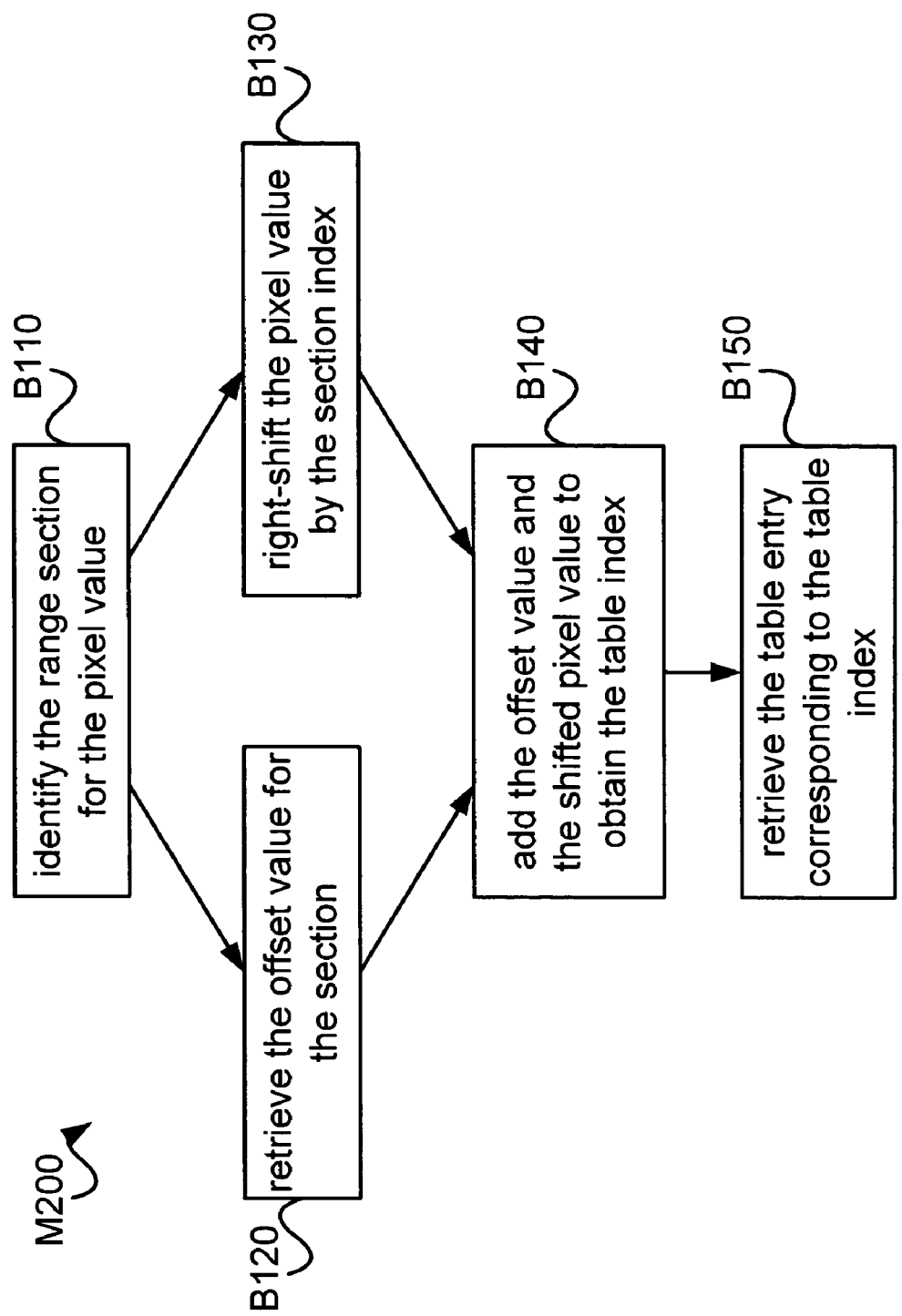
FIG. 10 is a flowchart of a method M200 according to an embodiment of the invention.

FIG. 10 shows a flowchart of a method M200 according to an embodiment. Based on a lookup table and associated sets of boundary points b and index offset values v, method M200 performs a mapping of a pixel value according to a nonlinear mapping function.

The set of boundary points b indicates a partitioning of the input range of P values into N sections. The range of P values may extend from 0 to M, where $M=2^s-1$ and s is the width in bits of the largest value in the range, such that $b_0=0$ and $b_N=M$. Alternatively, the range of P values may be limited to some portion less than all of the range (0–M).

For each input pixel value, task B110 identifies a corresponding section of the range of P values. Task B110 may be configured to determine a corresponding section index i, $0 \leq i \leq (N-1)$, based on the pixel value p and the set of boundary points b. In an example where the boundary point $b_i$ indicates the lower end of the section that includes the pixel value p, task B110 may be implemented according to either of the following expressions:

$$i = \max_j \{b_j \leq p\};$$

$$i = \left(\min_j \{b_j \geq p\}\right) - 1.$$

It is noted that in at least some cases, the set of boundary values need not explicitly include one or both of the terminal values.

Task B120 retrieves an offset value corresponding to the section identified in task B110. The offset value $v_i$ is related to the displacement in the lookup table, measured in number of entries, from a terminal value of the input range to section i. For example, the offset value $v_i$ may be related to the number of entries in the lookup table from the terminal value $b_0$ to the boundary value $b_i$, as in the following expression:

$$v_i = c_i - (b_i >> i), \quad \text{where } c_0 = b_0,$$

$$c_i = b_0 + \sum_{j=0}^{i-1} [(b_{j+1} - b_j) >> j] \text{ for } 0 < i < N.$$

Task B120 may be implemented to retrieve, from a set of offset values v, the value $v_i$ that corresponds to section i.

Based on the corresponding section identified in task B110, task B130 right-shifts the pixel value p. For example, task B130 may be implemented to perform a bit-wise right-shift of the pixel value p according to the section index i, as in the expression (p>>i). Typically such an operation may be performed at very little computational cost.

Task B140 obtains the table index k as a sum of the index offset value $v_i$ and the right-shifted pixel value (p>>i). In one example, task B140 is implemented according to the following expression: $k=v_i+(p>>i)$.

Task B150 retrieves a table entry corresponding to the table index k. In some applications of method M200, the lookup table has N sections, each being associated in order with a corresponding value of an index i, where $0 \leq i \leq (N-1)$. For example, the lookup table may be a table LUT2 as described above. In such an application, the table is generally configured such that each entry in section i is associated with $2^i$ different input values, although in some implementations this quantity may vary near one or more of the boundary points.

Method M200 may be configured such that task B150 retrieves the table entry LUT2[k] as the mapped value for the input pixel value. Task B150 may also be configured to use a lookup table whose entries have fewer bits than the maximum input pixel value (as in the example of FIG. 6). It may be desirable to configure task B150 to use a table that is selected from more than one alternative according to one or more criteria. For example, the table may be selected via an input signal received from a user interface and/or from an automatic mechanism, such selection being based on such criteria as a desired effect; a quality of the light incident on the image sensor, such as intensity and/or color temperature; and/or a quality of the light incident on another sensor such as a photocell or photoresistor.

Method M200 may be performed for each pixel in some or all of an image. Instances of method M200, each corresponding to a different pixel of an image, may be performed serially and/or in parallel. Prior to and/or subsequent to application of method M200 to a sensor signal that includes a set of pixel values, one or more operations may be performed on the signal such as demosaic-ing, white-balancing, and/or black-level compensation, in which a DC component may be subtracted from the signal. It may also be desired to map the sensor signal to a different color space.

Figure 11:
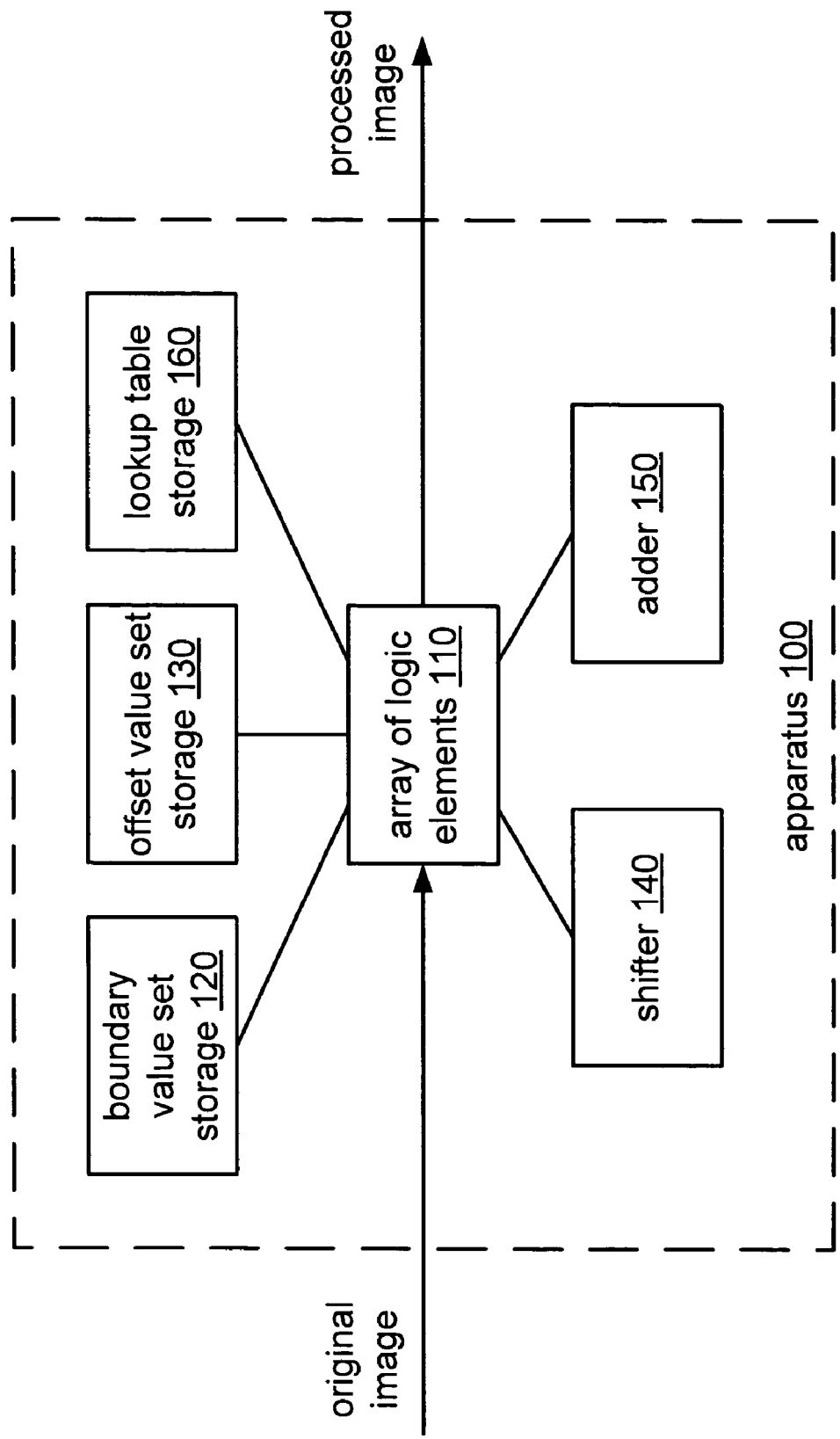
FIG. 11 shows a block diagram of an apparatus 100 according to an embodiment.

FIG. 11 shows a block diagram of an apparatus 100 according to an embodiment. Such an apparatus may be configured to perform an implementation of method M200. Array of logic elements 110 receives an input pixel value p and determines a corresponding section index i according to a set of boundary values stored in boundary value set storage 120. Based on the index i, array 110 retrieves an offset value from offset value set storage 130 and configures shifter 140 to perform a bit-wise right-shift of the value p. Adder 150 adds the offset value and right-shifted pixel value to produce a sum. Based on the sum produced by adder 150, array 110 retrieves and outputs a mapped value corresponding to the pixel value p from lookup table storage 160. Apparatus 100 may serially process each pixel in an image or image portion that is desired to be processed, or more than one implementation of apparatus 100 may be provided (possibly sharing one or more of storage 120, 130, and 160) to process pixels of an image in parallel.

Array of logic elements 110 may be implemented as a microprocessor or other digital signal processing unit and may be a stand-alone or embedded device. Such an array of logic elements such as transistors and/or gates may also be fabricated into an application-specific integrated circuit (ASIC) or application-specific standard product (ASSP) or programmed into a field-programmable gate array (FPGA) or similar device. In the context of a device or system including apparatus 100, such an array may also be used to execute other sets of instructions, such as instructions for activities not directly related to an operation of apparatus 100. Array 110 as described herein may also be implemented as one or more sets of instructions for execution on one or more arrays of logic elements.

Shifter 140 and adder 150 may be implemented as circuits, including logic elements such as transistors and/or gates, and/or as instructions for execution on an array of logic elements. For example, one or both of shifter 140 and adder 150 may be implemented within array 110 and/or as instructions for execution by array 110.

Each of boundary value set storage 120, offset value set storage 130, and lookup table storage 160 may be implemented as an array of storage elements in semiconductor memory, such as static, dynamic, or flash RAM, or in magnetic memory such as ferroelectric RAM. One or more of storage 120, 130, and 160 may be implemented in the same array of storage elements, and one or more of such storage may be implemented on the same chip as array 110.

One or more of the elements of apparatus 100 may be implemented on the same chip or on different chips of a chipset, which may be configured as a system including apparatus 100. In one example, one or more elements of apparatus 100 are implemented within a mobile station modem chip or chipset that is configured to control operations of various devices of a cellular telephone.

Although the example of a power function is discussed herein, methods according to embodiments may also be used with mapping functions that have other shapes. Such methods may be configured for use with nonlinear functions other than power functions and/or with applications other than gamma correction or alteration. For example, such a method may be used to apply a nonlinear mapping function for contrast enhancement. Methods according to embodiments may also be configured for applications in which the processed image is intended for a use other than display, such as machine-vision applications.

Even in the absence of incident light, a sensor such as a CCD sensor will typically output a nonzero signal due to temperature-dependent noise processes (also called "dark noise"). A signal from a CMOS sensor will generally have an even higher level of dark noise than the signal from a CCD sensor. As may be seen in the example of FIG. 1, a typical gamma curve has a steep rise at the lower end of the input range. This steep rise may have the effect of elevating noise in dark regions of an image.

Figure 12:
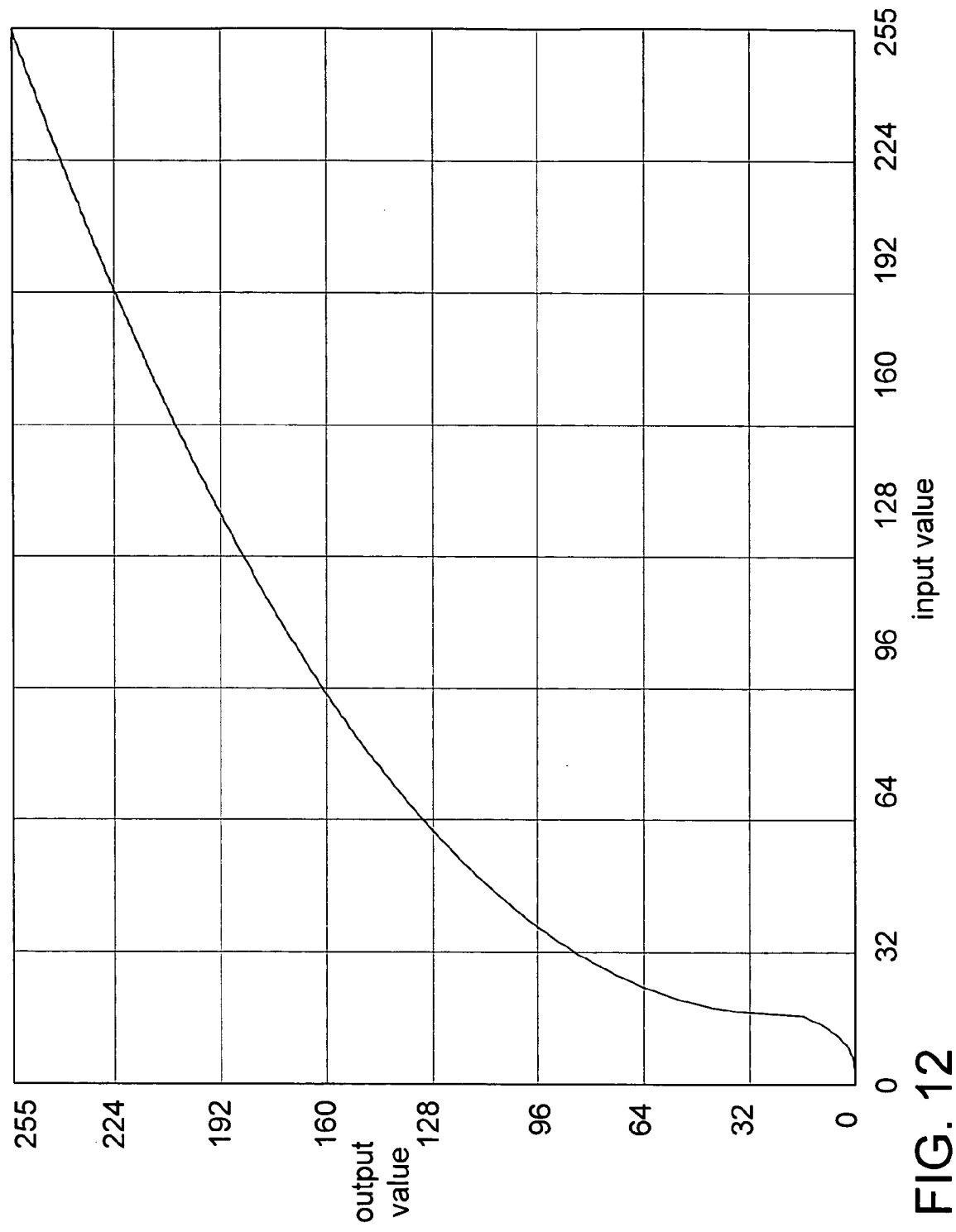
FIG. 12 is an example of a sigmoid gamma curve.

The nonlinear mapping function $f$ may be designed to produce a gamma curve that depresses sensor and/or display noise at low input levels. Such a curve may have a sigmoid shape, with a low slope at the lower end of the input range. FIG. 12 shows one example of such a curve. Alternatively, the nonlinear mapping function $f$ may be designed to produce a gamma curve that has a short linear segment at the lower end of the input range. For example, the function $f$ may be designed to implement or approximate the Rec. 709 transfer function, which has a slope of 4.5 across the input range of (0-0.018) (where the input range is normalized to 0-1.0) and follows the power function $\gamma=0.45$ elsewhere.

In some applications of a nonlinear mapping function, it may be desirable to construct a table according to a different nonlinear partitioning or to use a table that is so constructed. For example, it may be desirable to apply a nonlinear mapping function $f$ that has a slope which is not monotonically decreasing. In such cases, a lookup table in which $2^i$ different input values are mapped to each entry in the i-th section may have a high error with respect to the mapping function $f$.

A method M10 according to an embodiment selects a set of boundary values b according to a number of sections N, a set of reduction factors x, and a desired maximum number of table entries L. Method M110 represents a particular embodiment of method M10 in which $x_i=2^i$.

Method M10 includes a task A10 that selects a set of boundary values according to the following conditions:

a) $b_i < b_{i+1}$, $\forall i$, $0 \leq i < N$.
b) For $0 < i < N$, $b_i$ is a multiple of $x_i$.

c) $\sum_{i=0}^{N-1} \left\lceil \frac{(b_{i+1} - b_i)}{x_i} \right\rceil \leq L.$ Task A110 represents a particular embodiment of task A10.

Figure 13:
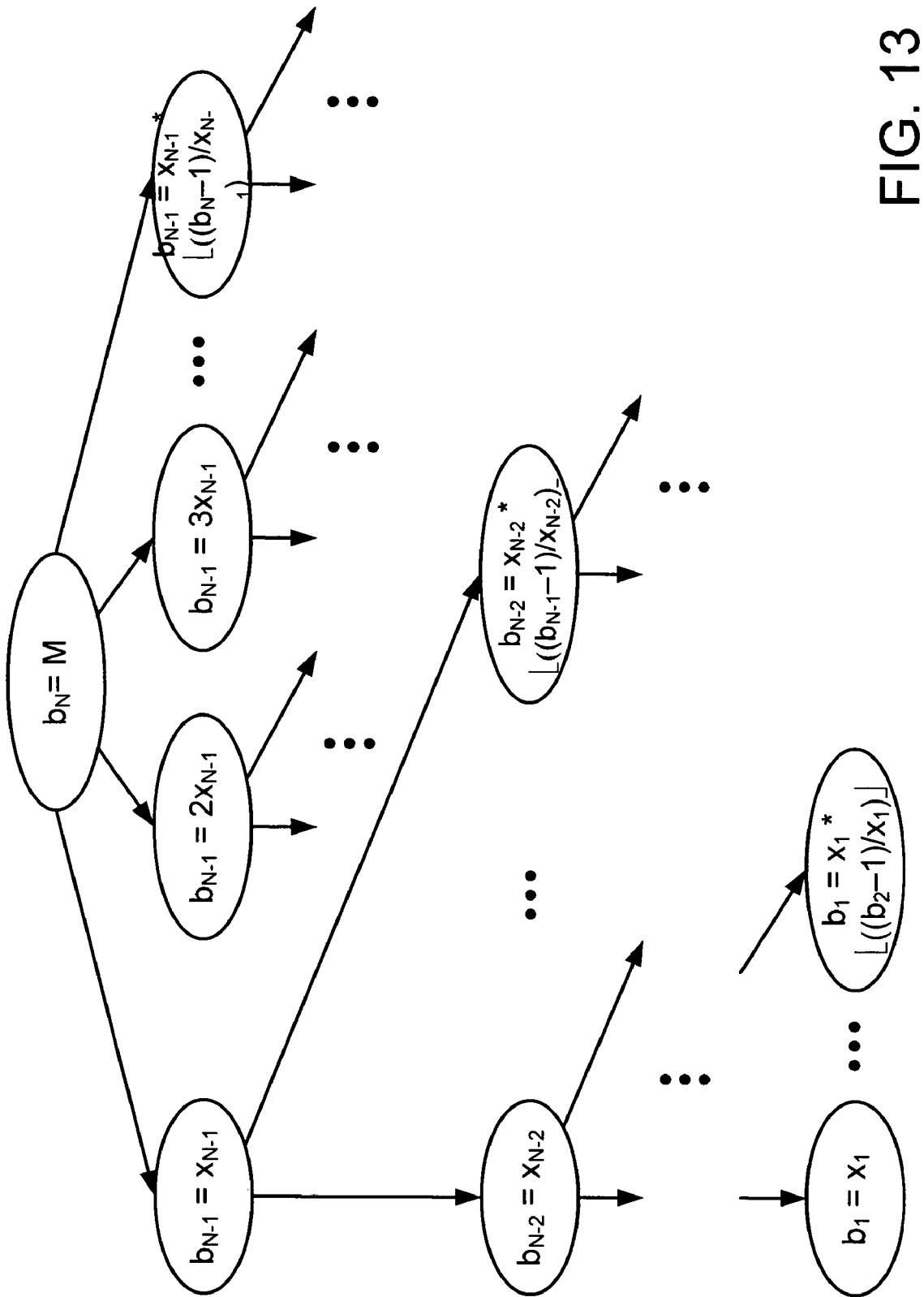
FIG. 13 shows an example of sets of boundary points organized as paths of a tree.

FIG. 13 shows one example of a tree that represents a universe of possible candidate sets b for $(b_0, b_N)=(0, M)$. The nodes at each level below the root in this tree may be enumerated according to the following expression:

$$b_i = x_i \times h_i, \quad \text{where } h_i = \left\{1, 2, \ldots, \left\lfloor \frac{b_{i+1} - 1}{x_i} \right\rfloor\right\}.$$

Method M10 also includes a task A20 that calculates a set of index offset values v based on the selected set of boundary values b and the reduction factors x. In one example, task A20 calculates the index offset values according to the expression $$v_i = c_i - \left\lfloor \frac{b_i}{x_j} \right\rfloor, \quad \text{where } v_i = \sum_{j=0}^{i-1} \left\lceil \frac{(b_{j+1} - b_j)}{x_j} \right\rceil.$$

In an implementation where the elements $x_i$ of the set of reduction factors x are nonnegative integer powers of 2, task A20 may be configured to calculate the index offset values according to the expression $$v_i = c_j - (b_i >> x_i), \quad \text{where } c_i = \sum_{j=0}^{i-1} [(b_{j+1} - b_j) >> x_j].$$

Task A200 represents a particular embodiment of task A20 in which $x_i=2^i$.

Based on a mapping function $f$, the set of boundary points b, and the set of reduction factors x, task A30 constructs a lookup table LUT2 having N sections and $K \leq L$ entries. Task A30 may be configured according to a generalization of implementation of task A310 or A320 as described above, in which the function r is generalized as $r=(q-v_i) \times x_i$ and the table entries are computed according to one of the following expressions:

$LUT2[q]=g\{f(r),f(r+1),\ldots,f(r+x_i-1)\};$ $LUT2[q]=g\{LUT1[r],LUT1[r+1],\ldots,LUT1[r+x_i-1]\}.$ In a case where $(r+x_i-1)>b_{i+1}$, such that some of the $x_i$ input values of function g are in section (i+1), it may be desired to modify the function g to produce an appropriate result based on only those values in section i.

According to a similar generalization of an implementation of task A400 as described herein, method M10 may include a task configured to calculate an error of table LUT2. Method M10 may also include implementations of task A500 and A600.

A method M20 according to an embodiment performs a mapping of a pixel value according to a nonlinear mapping function. Method M20 is implemented as a generalization of method M200, in which the table index k is calculated according to an expression such as $$k = v_i + \left\lfloor \frac{p}{x_i} \right\rfloor$$

or $k=v_i+(p\!>\!>\!x_i)$, as may be appropriate.

Figure 14:
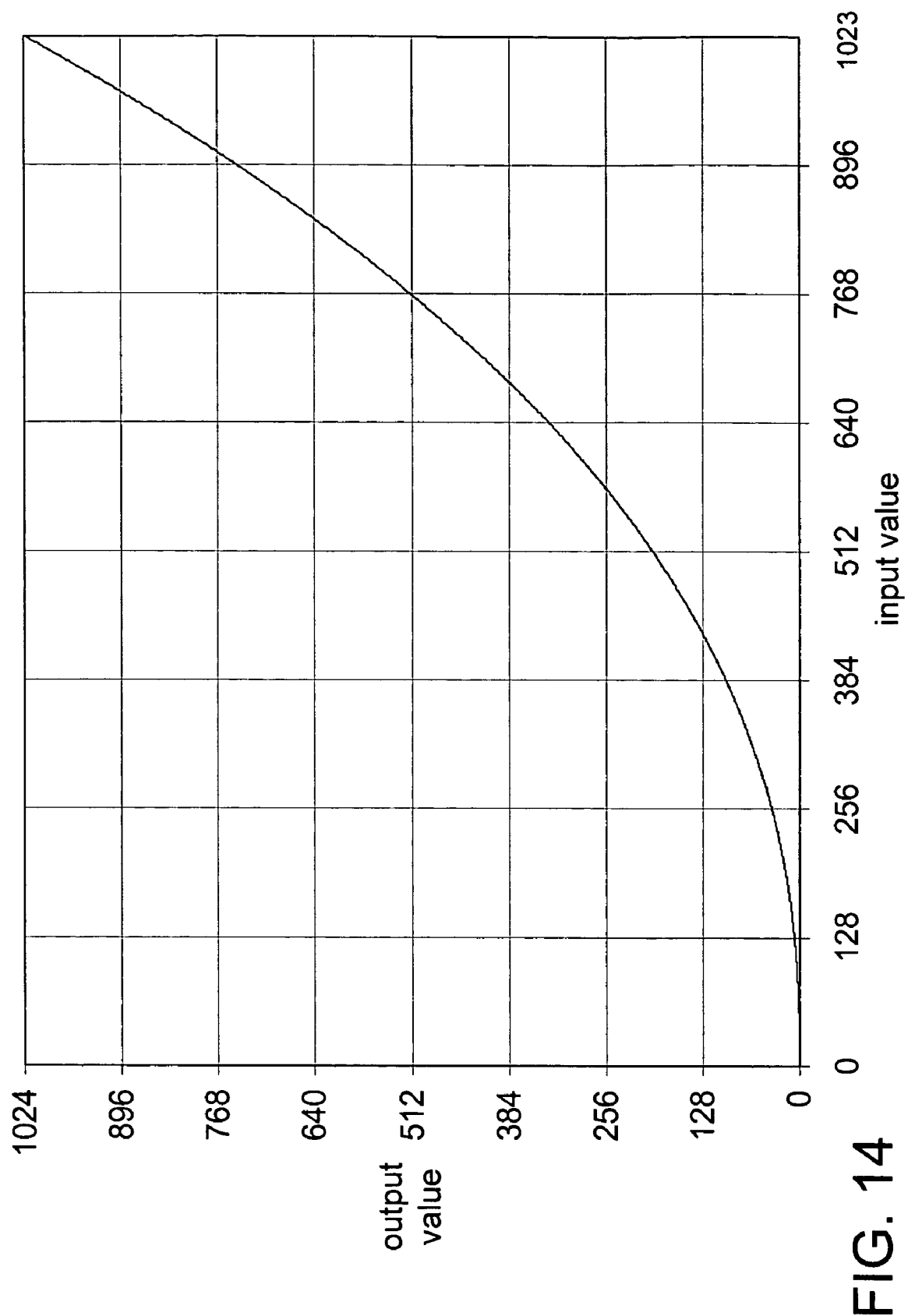
FIG. 14 is a diagram of a gamma curve.

In one application, an implementation of method M20 is used to perform gamma correction of an image signal according to a gamma curve for a display device as shown in FIG. 14. In this example, $x_i=2^{N-i}$ and $\gamma=2.4$.

Embodiments include methods of obtaining a nonlinearly partitioned lookup table that are suitable for implementation in hardware, software, and/or firmware. Such a method may be used to reduce the size of a lookup table significantly without perceptible degradation of image quality. In one application, a 1024-value lookup table was reduced to a 256-value lookup table, and the reduced table was found to perform very well in both indoor and outdoor situations. Throughout the dynamic range, no perceivable difference was found between images produced using the original table and the images produced using the reduced table. Potential advantages of a reduction in table size include reduced storage requirements and faster loading. Embodiments also include methods of applying a nonlinear partitioning of an input range of values to assign a local mapping resolution according to a rate of change between adjacent mapped values.

Further embodiments include methods of applying a nonlinear mapping function that may be implemented in hardware, software, and/or firmware. Such implementations may be memory-efficient and/or computationally efficient. Typically a table lookup operation may be performed rapidly, such that a method according to an embodiment may be used to perform pixel-by-pixel mapping at run-time.

In a further embodiment of method M200, the mapped value is obtained by using the section index i to modify the table entry retrieved from table LUT2. In one example, a correction value is added to the table entry, where the correction value is the product of p[i:0] (the rightmost i bits of the pixel value p) and a slope value $m_i$ corresponding to section index i. In another example, the mapped value is obtained via linear interpolation between the table entry k and the next table entry (k+1) according to an expression such as $$\frac{2^i - p[i:0]}{2^i} LUT2[k] + \frac{p[i:0]}{2^i} LUT2[k+1],$$

in which the multiplication and division operations may be performed at low computational cost using bit-wise shifts. Such modification of the mapped value may be used to further reduce error, and a generalization of such examples may also be applied to an implementation of method M20.

The foregoing presentation of the described embodiments is provided to enable any person skilled in the art to make or use the present invention. Various modifications to these embodiments are possible, and the generic principles presented herein may be applied to other embodiments as well. For example, embodiments may include applying a nonlinear mapping to some or all of the images in a sequence of images such as a video signal.

An embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Embodiments also include computer programs containing one or more sets (for example, sequences) of machine-executable instructions describing a method as disclosed herein, and data storage media (such as semiconductor or magnetic memory such as ROM or RAM, magnetic or optical disk) having such sets of instructions stored therein. Thus, the present invention is not intended to be limited to the embodiments shown above but rather is to be accorded the widest scope consistent with the principles and novel features disclosed in any fashion herein.

What is claimed is:

1. A method of processing an image comprising:
   using an array of logic elements to perform the steps of:
   partitioning a gamma curve range P of a first look-up-table (LUT) into a set of boundary values for N sections;
   selecting and combining one or more entries in each of the N sections of the first LUT to form entries in a second LUT, wherein the size of the selections increases with successive sections,
   selecting one among a plurality of offset values for each of a plurality of picture element values in at least a portion of the image;
   obtaining an index value based on (A) the selected offset value and (B) a portion of the picture element value for each of the plurality of picture element values; and
   retrieving an entry from the second lookup table according to a corresponding index value for each of the plurality of picture element values.

2. The method of image processing according to claim 1, wherein each of the plurality of picture element values has a width of s bits, and wherein the second lookup table has fewer than $2^s$ entries.

3. The method of image processing according to claim 1, wherein the width of a picture element value is greater than the width of the corresponding entry retrieved from the second lookup table.

4. The method of image processing according to claim 1, wherein a difference between two of the plurality of picture element values is greater than the number of entries in the second lookup table.

5. The method of image processing according to claim 1, wherein said selecting one among a plurality of offset values comprises:
   identifying, from among a plurality of sections of a range of values, the section that includes the picture element value; and
   retrieving an offset value associated with the section.

6. The method of image processing according to claim 5, wherein said obtaining an index value comprises shifting the picture element value according to a position of the corresponding section within the plurality of sections.

7. The method of image processing according to claim 6, wherein said shifting the picture element value comprises bit-wise right-shifting the picture element value.

8. The method of image processing according to claim 1, wherein said obtaining an index value comprises obtaining a sum of the offset value and a shifted portion of the picture element value.

9. The method of image processing according to claim 1, wherein, for each of the plurality of picture element values, said retrieving an entry from the second lookup table includes retrieving a picture element value of a second image from the second lookup table according to the corresponding index value.

10. The method of image processing according to claim 9, wherein the width of at least one of the plurality of picture element values is greater than the width of the corresponding picture element value retrieved from the second lookup table.

11. The method of image processing according to claim 1, said method comprising receiving the image from a sensor.

12. The method of image processing according to claim 1, said method comprising outputting a processed image based on the image and including the retrieved entries,
    wherein each of the plurality of picture element values has a position in the image, and
    wherein the position of each of the retrieved entries in the processed image is based on the position in the image of the corresponding picture element value.

13. The method of image processing according to claim 1, said method comprising displaying an image signal including the entries retrieved from the second lookup table.

14. The method of image processing according to claim 1, said method comprising storing to a data storage medium an image signal that includes the entries retrieved from the second lookup table.

15. The method of image processing according to claim 1, said method comprising, for each of a plurality of color components of the plurality of picture element values, performing (A) said selecting one among a plurality of offset values, (B) said obtaining an index value, and (C) said retrieving an entry from the second lookup table.

16. The method of image processing according to claim 1, said method comprising:
    loading a third lookup table different than the second lookup table;
    for each of the plurality of picture element values, selecting one among a second plurality of offset values;
    for each of the plurality of picture element values, obtaining a second index value based on (A) the offset value selected from the second plurality of offset values and (B) a portion of the picture element value; and
    for each of the plurality of picture element values, retrieving an entry from the third lookup table according to the corresponding second index value.

17. An apparatus configured to process an image, said apparatus comprising:
    an array of logic elements configured to (A) identify, for each of a plurality of picture element values in at least a portion of the image, and from among a plurality of sections of a range of values, the section that includes the picture element value and (B) retrieve an offset value associated with the section;
    a shifter configured to right shift each of the plurality of picture element values according to a position of the corresponding section within the plurality of sections;
    an adder configured to obtain, for each of the plurality of picture element values, an index value based on the offset value and the shifted picture element value,
    wherein the array of logic elements is configured to retrieve, for each of the plurality of picture element values, an entry from a lookup table according to the corresponding index value.

18. The apparatus configured to process an image according to claim 17, said apparatus comprising a sensor configured to provide the image.

19. The apparatus configured to process an image according to claim 17, said apparatus comprising a display configured to display a processed image based on the entries retrieved from a lookup table.

20. The apparatus configured to process an image according to claim 17, said apparatus comprising:
    a sensor configured to provide a signal upon which the image is based;
    a display configured to display a processed image based on the entries retrieved from a lookup table; and
    a user interface configured to control the apparatus to wirelessly transmit a signal based on the processed image to a network for cellular communications.

21. An apparatus configured to process an image, said apparatus comprising:
    means for partitioning a gamma curve range P of a first look-up-table (LUT) into a set of boundary values for N sections;
    means for selecting and combining one or more entries in each of the N sections of the first LUT to form entries in a second LUT, wherein the size of the selections increases with successive sections,
    means for selecting one among a plurality of offset values for each of a plurality of picture element values in at least a portion of the image;
    means for obtaining an index value based on (A) the selected offset value and (B) a portion of the picture element value for each of the plurality of picture element values; and
    means for retrieving an entry from the second lookup table according to a corresponding index value for each of the plurality of picture element values.

22. A computer-readable medium for processing an image, the computer-readable medium storing instructions that when executed perform a method of:
    partitioning a gamma curve range P of a first look-up-table (LUT) into a set of boundary values for N sections;
    selecting and combining one or more entries in each of the N sections of the first LUT to form entries in a second LUT, wherein the size of the selections increases with successive sections,
    selecting one among a plurality of offset values for each of a plurality of picture element values in at least a portion of the image;
    obtaining an index value based on (A) the selected offset value and (B) a portion of the picture element value for each of the plurality of picture element values; and
    retrieving an entry from the second lookup table according to a corresponding index value for each of the plurality of picture element values.

* * * * *

UNITED STATES PATENT AND TRADEMARK OFFICE
CERTIFICATE OF CORRECTION

| | | |
|---|---|---|
| PATENT NO. | : 7,702,169 B2 | Page 1 of 1 |
| APPLICATION NO. | : 11/208270 | |
| DATED | : April 20, 2010 | |
| INVENTOR(S) | : Hung et al. | |

It is certified that error appears in the above-identified patent and that said Letters Patent is hereby corrected as shown below:

Column 16, line 14, claim 19: "a lookup table" to read as --the lookup table--

Column 16, line 20, claim 20: "a lookup table" to read as --the lookup table--

Signed and Sealed this
Twelfth Day of July, 2011

David J. Kappos
*Director of the United States Patent and Trademark Office*